US008705550B2

(12) United States Patent
Shah et al.

(10) Patent No.: US 8,705,550 B2
(45) Date of Patent: Apr. 22, 2014

(54) DEVICE INTERFACE ARCHITECTURE AND PROTOCOL

(75) Inventors: Keyur C. Shah, San Diego, CA (US); Jeffrey Alan Dyck, San Diego, CA (US); James Lionel Panian, San Marcos, CA (US); Uppinder Singh Babbar, San Diego, CA (US); Nikolai Konrad NepomucenoLeung, Takoma Park, MD (US)

(73) Assignee: QUALCOMM Incorporated, San Diego, CA (US)

( * ) Notice: Subject to any disclaimer, the term of this patent is extended or adjusted under 35 U.S.C. 154(b) by 1292 days.

(21) Appl. No.: 11/499,238

(22) Filed: Aug. 3, 2006

(65) Prior Publication Data
US 2007/0124439 A1    May 31, 2007

Related U.S. Application Data

(60) Provisional application No. 60/706,711, filed on Aug. 8, 2005.

(51) Int. Cl.
*H04L 12/28* (2006.01)
*H04J 3/16* (2006.01)
*H04J 3/24* (2006.01)
*G06F 15/16* (2006.01)

(52) U.S. Cl.
USPC ............ 370/421; 370/469; 370/474; 709/227

(58) Field of Classification Search
USPC .......................................................... 709/223
See application file for complete search history.

(56) References Cited

U.S. PATENT DOCUMENTS

| 5,802,298 | A | | 9/1998 | Imai et al. | |
|---|---|---|---|---|---|
| 5,930,265 | A | * | 7/1999 | Duault et al. | 370/473 |
| 5,936,967 | A | * | 8/1999 | Baldwin et al. | 370/474 |
| 6,678,735 | B1 | * | 1/2004 | Orton et al. | 709/230 |
| 6,711,162 | B1 | | 3/2004 | Ortega et al. | |
| 6,785,436 | B2 | * | 8/2004 | Ravikanth et al. | 385/16 |

(Continued)

FOREIGN PATENT DOCUMENTS

| JP | H0962526 A | 3/1997 |
|---|---|---|
| JP | 2000215134 A | 8/2000 |

(Continued)

OTHER PUBLICATIONS

"Universal Serial Bus Device Class Definition for MIDI Devices," (Online) Nov. 1, 1999, pp. 1-43. URL:http://www.usb.org/developers/devclasses_docs/midi10.pdf.

(Continued)

*Primary Examiner* — Asad Nawaz
*Assistant Examiner* — Cassandra Decker
(74) *Attorney, Agent, or Firm* — Kevin T. Cheatham

(57) ABSTRACT

An interface architecture and protocol are provided for transferring messages between a plurality of devices. The architecture provides the capability to generate a plurality of service messages according to a single message format, and to transfer the service messages between a plurality of control points or service entities according to an efficient multiplexing protocol. The control points can be software applications or device drivers running on a terminal equipment device, and the service entities can be communication services such as network access services or device management services running on an attached data communication device such as a modem or a cellular phone.

81 Claims, 7 Drawing Sheets

(56) References Cited

U.S. PATENT DOCUMENTS

| | | | |
|---|---|---|---|
| 6,993,021 | B1 | 1/2006 | Chuah et al. |
| 7,013,005 | B2* | 3/2006 | Yacoub et al. ............ 379/265.13 |
| 7,013,338 | B1* | 3/2006 | Nag et al. ....................... 709/226 |
| 7,185,105 | B2* | 2/2007 | Chang et al. .................. 709/236 |
| 7,194,689 | B2* | 3/2007 | Manni et al. .................. 715/735 |
| 7,284,062 | B2* | 10/2007 | Krantz et al. ................. 709/229 |
| 7,376,750 | B1* | 5/2008 | Simu ............................. 709/245 |
| 7,548,960 | B2* | 6/2009 | Kang et al. .................... 709/218 |
| 2003/0005130 | A1* | 1/2003 | Cheng ........................... 709/228 |
| 2004/0208159 | A1* | 10/2004 | Jung et al. ..................... 370/346 |
| 2004/0215758 | A1* | 10/2004 | Kompella et al. ............. 709/223 |
| 2005/0105481 | A1* | 5/2005 | Gazda et al. .................. 370/310 |
| 2005/0125564 | A1* | 6/2005 | Bushmitch et al. ........... 709/250 |
| 2005/0267935 | A1* | 12/2005 | Gandhi et al. ................. 709/203 |
| 2006/0031530 | A1* | 2/2006 | Iizuka ........................... 709/227 |
| 2006/0184999 | A1* | 8/2006 | Guichard et al. .................. 726/3 |
| 2007/0058642 | A1* | 3/2007 | Eisink ........................... 370/401 |
| 2007/0171902 | A1* | 7/2007 | Simonsson et al. ........... 370/389 |

FOREIGN PATENT DOCUMENTS

| | | |
|---|---|---|
| JP | 2000286894 | 10/2000 |
| JP | 2001517910 | 10/2001 |
| JP | 2002101096 A | 4/2002 |
| JP | 2004259176 A | 9/2004 |
| WO | WO-9916266 A1 | 4/1999 |
| WO | 2004/019578 A1 | 3/2004 |
| WO | 2004/110021 A2 | 12/2004 |

OTHER PUBLICATIONS

Andrew S. Tannenbaum, computer network, Fourth edition, Japan, Nikkei BP, Dec. 15, 2003, p. 498.
Taiwanese Search Report—095129066—TIPO—Feb. 22, 2010.
International Search Report and Written Opinion—PCT/US2006/031149—ISA/EPO—Jan. 10, 2007.

* cited by examiner

DEVICE INTERFACE ARCHITECTURE AND PROTOCOL

CLAIM OF PRIORITY UNDER 35 U.S.C. §119

The present Application for Patent claims priority to Provisional Application Ser. No. 60/706,711, filed Aug. 8, 2005, assigned to the assignee hereof, and hereby expressly incorporated by reference herein.

BACKGROUND

1. Field

The present invention relates to data processing in digital electronic devices, and more particularly, to communication of messages between one or more application clients and one or more service entities.

2. Background

Modern computing devices such as personal computers, laptops, and personal digital assistants are often tethered to a data communication device such as a modem to enable the computing device to communicate over an interface such as IEEE 802.11, Code Division Multiple Access (CDMA), General Packet Radio Service (GPRS), or Universal Mobile Telecommunications System (UMTS). An operating system running on the computing device typically supports software application clients, such as a connection manager client, that use the communications capability provided by the data communication device to send and receive data. The data communication device itself may provide a number of services to software applications running on the computing device, such as a network access service for accessing a network system status, a wireless data service for transmitting and receiving data over a wireless link, and a device management service for accessing device identification and power level status.

At the physical layer, the communication between a computing device and the data communication device can take place over physical interconnect, such as serial buses including USB, RS-232, PCI and PCMCIA, or wireless interfaces including Bluetooth and IEEE 802.11. For upper-layer communication between application clients running on the computing device and services running on the data communication device, i.e., the client-service interface, protocols that have been utilized in the prior art include the AT command set specified for W-CDMA 3GPP terminals (see "AT command set for User Equipment, Release 1999, 3GPP TS 27.007 V3.13.0 (2003)) and CDMA 3GPP2 terminals (see "Data Service Options for Spread Specrum Systems: AT Command Processing and the Rm Interface," 3GPP2 C.S0017-003-A), Remote Network Driver Interface Specification (RNDIS), and Universal Plug and Play (UPnP).

Recently, computing devices are supporting an increasing number of communications applications, while data communication devices are increasingly capable of supporting a multiple number of communications technologies. For example, a laptop computer may be running communications applications such as web browser, email, and calendar synchronization using a modem that supports Bluetooth, IEEE 802.11, and CDMA. This type of scenario has led to an increased need for certain client-service interface features not readily found in the prior art.

SUMMARY

One aspect of the present invention provides a device comprising a control module for generating at least one service message; and a multiplex module for generating a multiplex message, said multiplex message comprising said at least one service message, a client ID field for identifying at least one control point associated with said at least one service message, and a service type field for identifying a service entity associated with said at least one service message.

Another aspect of the present invention provides a device comprising a control means for generating at least one service message; and a multiplex means for multiplexing said service messages generated by said plurality of control modules over a common channel.

Yet another aspect of the present invention provides a method for interfacing a plurality of devices, said method comprising providing at least one service message; generating a multiplex message comprising said at least one service message, a client ID field for identifying a control point associated with said at least one service message, and a service type field for identifying a service entity associated with said at least one service message.

DETAILED DESCRIPTION

The features of modern TE's and DCD's have led to an increased need for certain client-service interface features not readily found in the prior art. For example, to ease implementation of the application client software, it would be desirable to have a set of service commands defined for a client-service interface that is independent of the particular technology used by the data communication device. In addition, for flexibility of control, it would be desirable to have a communication channel between the computing device and data communication device that can support simultaneous data and control sessions. Furthermore, it would be desirable to have a multiplexing protocol capable of simultaneously supporting multiple clients on single or multiple computing devices communicating with multiple services running on single or multiple communication devices.

Figure 1:
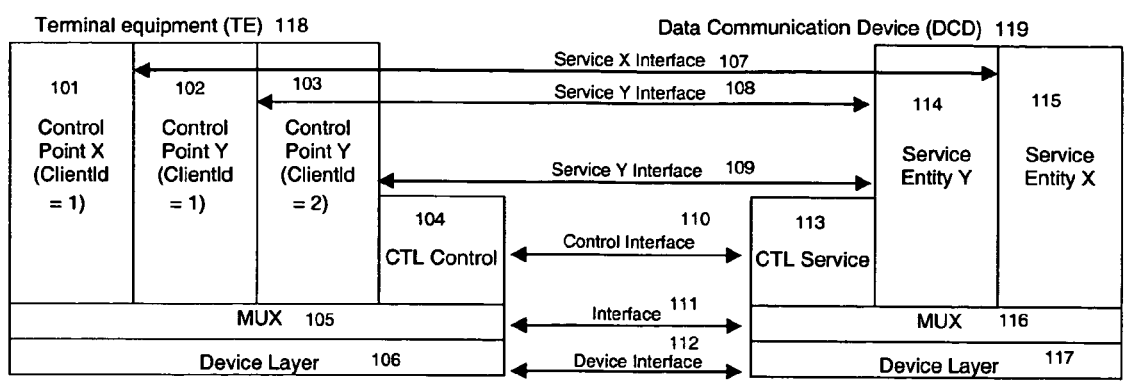
FIG. 1 shows a layered messaging architecture that can be employed for communication between devices according to an embodiment of the present invention.

FIG. 1 shows a layered messaging architecture that can be employed for communication between application clients on a terminal equipment (TE) 118 and service entities running on a data communication device (DCD) 119. In an embodiment, the data communication device may be a modem comprising a number of application-specific integrated circuits (ASICs). The terminal equipment may support software or hardware application clients or device drivers known as control points 101, 102, 103 that communicate with service entities 114, 115 running on the DCD 119. Examples of application clients include a connection manager, a voice over IP application, or a communications device driver. Examples of service entities include a wireless data service entity for transmitting and receiving data over a wireless link, a network access service entity for accessing network system status, and a device management service entity for accessing device identification and device power level status. In this specification and in the claims, application clients and service entities may also be collectively referred to as control modules.

As shown in FIG. 1, peer-to-peer messages sent between control points 101, 102, 103 and service entities 114, 115 over service interfaces 107, 108, 109 can generally be referred to as service interface messages or service messages. Each service entity defines a supported set of service messages and service message formats. In an embodiment, the format of a service interface message may be specified according to a generalized service template described later in this specification. Such a template allows an application client to control various services supported by a DCD using a single, unified interface.

In an embodiment, service messages may be control messages encapsulating higher-layer application program interface (API) messages between a control point and a service entity over a logical control channel. Such API messages may be specific to each application client. In an embodiment, service interface messages need not encapsulate API messages, and can be separately defined for each particular service entity.

Special CTL control entity 104 and CTL service 113 may be used by clients or drivers on the terminal equipment 118 and DCD 119 for such functions as negotiating a client ID and obtaining the service message version of the TE and/or DCD. Note on the terminal equipment 118, the CTL control 104 may be implemented either as part of the driver or as a separate entity.

Figure 2:
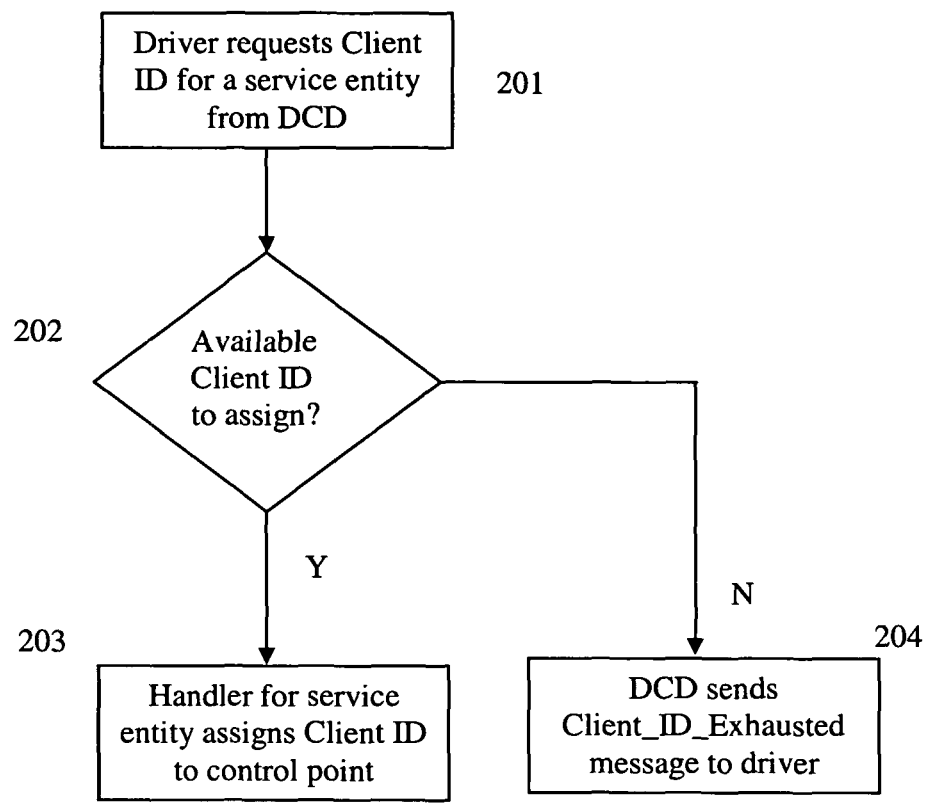
FIG. 2 describes a procedure for a data communication device to assign a client ID to an individual control point requesting use of a service entity according to an embodiment of the present invention.

FIG. 2 describes a procedure for a DCD to assign a client ID to an individual control point requesting use of a service entity. A driver initially sends a request for a Client ID to the DCD at block 201. If there is an unused client ID available at block 202, the handler for the service entity requested may assign the client ID to the control point at block 203. Control points may be implemented in a driver, a kernel module, a library, or a user application. In an embodiment, there is a control point in each driver and one or more in each application. Note if there are multiple drivers using the same type of service, then each driver can have its client ID assignment sent to itself through a dedicated physical interconnection channel, e.g., a dedicated USB channel. If there is no client ID available, then the handler may send a message to the driver that all client ID's have been exhausted for the service entity at block 204. Note if the driver no longer needs to communicate with a service entity, the driver can release the client ID by sending a release client ID request.

Referring again to FIG. 1, service messages sent over the service interfaces 107, 108, 109 may be further encapsulated for transport over a MUX layer, as implemented by MUX module 105 on the TE and MUX module 116 on the DCD. The MUX layer ("MUX") allows multiplexing of service interface messages over a single physical interconnect such as Universal Serial Bus (USB). MUX may also identify the entity type (e.g., Service or Control) that sent a particular message. For each service entity, MUX may also support multiple control points by specifying a client ID field, thus allowing multiple clients to utilize a single service entity.

Note the capability to support multiple clients simultaneously enables a service to allocate a separate communication path for each control point. This allows, for example, control points to separately exchange authentication credentials with a service entity, thereby allowing a service to access only authorized clients, and vice versa. Furthermore, the service can negotiate encryption keys with each control point for integrity and confidentiality protection. For resource management, a service can also track and restrict the number of clients accessing the service simultaneously. The service can also track client-specific state information for each client, as well as arbitrate requests received from multiple clients. Note the preceding enumeration of features is only meant to illustrate some of the benefits of an embodiment of the invention supporting multiple simultaneous clients. The enumeration of features is not meant to limit the scope of the invention to only embodiments having such features.

MUX messages may be further processed for transport over a device layer implemented by device layer modules 106 and 117. A device layer may include such modules as a function driver (not shown), a logical device (not shown), and a bus driver (not shown) for driving a device interface 112 over physical interconnect such as USB, RS-232, PCI, and PCMCIA, or wireless links such as Bluetooth and IEEE 802.11, and Shared Memory Interfaces. In an embodiment, each logical device may also be provided with an independent data channel (not shown) for communicating with a service entity, the independent data channel capable of operating simultaneously with the control channel. For example, separate transmit and receive path queueing may be provided for the data channel and the control channel, as well as independent flow control mechanisms and independent data transmission scheduling. In an embodiment, separate data and control channels are implemented by utilizing additional endpoint pairs on a Universal Serial Bus (USB) interface. The data channel can employ standard data link layer protocols, such as the IEEE 802.3 Ethernet data link layer protocol. Link layer framing for the data channel may be implemented in the physical interconnect drivers, e.g., USB drivers, with the end of a packet delimited by zero-length USB frames. In an embodiment, Internet Protocol (IP) packets may be sent directly over the data channel if the physical layer (e.g., USB) can support framing and boundary detection of such IP packets. In particular, the physical layer frame size should be long enough to contain an entire IP packet, while the physical layer driver should be able to mark frame boundaries to contain exactly one IP packet.

Figure 6:
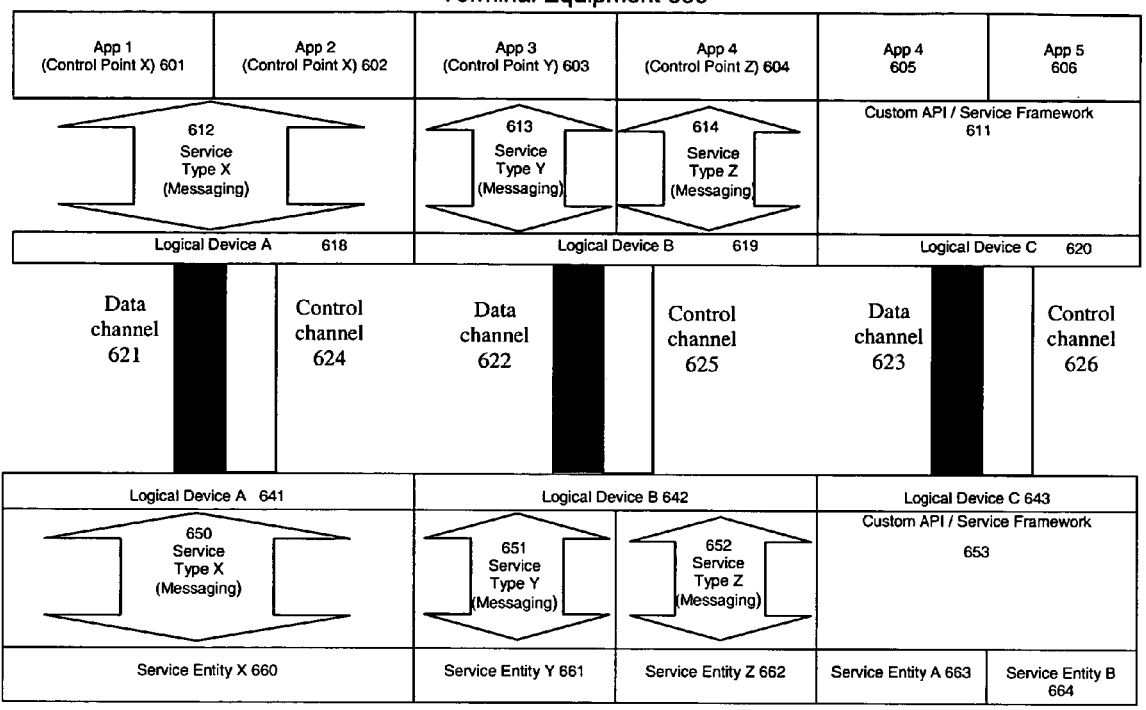
FIG. 6 shows an embodiment of the present invention comprising separate data channels and control channels according to an embodiment of the present invention.

FIG. 6 shows an embodiment of a terminal equipment 600 communicating with a DCD 630 over separate data and control channels. Control Point 601 associated with Application 1, Control Point 602 associated with Application 2, Control Point 603 associated with Application 3, and Control Point 604 associated with Application 4 are shown generating and receiving service messages 612, 613, 614. The service messages 612, 613, 614 are passed to/from logical devices 618, 619. Logical device 618 provides a separate data channel 621 and control channel 624, while logical device 619 provides a separate data channel 622 and control channel 625. On the DCD 630, a corresponding functional hierarchy may be implemented, e.g., logical devices 641, 642 each for driving separate data and control channels, and service messaging 650 651, 652 for communicating with service entities 660, 661, 662.

Note that the terminal equipment 600 may also include applications 605, 606 that generate and receive service messages over a custom API/service framework, along with a corresponding logical device 620, data channel 623 and control channel 626. Such custom applications may share the same physical interconnect layer with control points 601, 602, 603, 604, or the custom applications can be provided with a separate physical interconnect. On the DCD 630, a custom API/service framework 653, with a corresponding logical device 643, may also be provided for communicating with service entities 663, 664. Note that while logical devices 618, 619, 620 are each shown supporting a separate data channel and control channel in this embodiment, in other embodiments a logical device may support only a single channel for transporting both data and control.

In an embodiment, the DCD can be a Mobile Station Modem (MSM) chipset available from Qualcomm® Inc. of San Diego, Calif., and the terminal equipment can be a device such as a personal computer (PC), notebook computer, personal digital assistant (PDA), or Smartphone. Note that the embodiments depicted in FIGS. 1 and 6 are illustrative only, and are not intended to limit the scope of the invention. For example, the endpoints of the communication need not be a DCD and a terminal equipment. Rather, any communication between an application and a service, running in either hardware or software, may employ the techniques of the present invention, e.g., a personal computer connected to an MP3 player over a USB cable, or even control points and services running in the same device on different processors, communicating over any standard inter-process communication (IPC) mechanisms. Furthermore, additional messaging protocol layers beyond those explicitly shown in FIGS. 1 and 6 may be present, e.g., additional transport layers between the MUX layer and device layer.

A messaging protocol for facilitating the architecture given above will now be described. Referring again to FIG. 1, control point 101 representing an application running on the terminal equipment 118 can communicate with a service entity 115 running on the DCD 119 over a service interface 107 using service messages. In one embodiment, a service message can be one of three types: a request message, a response message, and an indication message. The type of a particular message can be indicated in a corresponding field sent with the message.

A request message is issued by a control point, and may set parameter values at the service entity, query parameter values from the service entity, or configure the generation of indication messages by the service entity. A valid request will generally elicit a corresponding response from a service entity. Note a control point need not wait for a response to a previously sent request before sending a new request. This allows for asynchronous operation between client and service.

A response message is issued by a service entity in response to a received request message. A response may contain a result code indicating success or failure or error status, depending on the operation requested. Additional fields may be present in the response to communicate other data associated with the request.

An indication message may be issued by a service entity either in response to a request or without any solicitation by a control point. Indications may either be broadcast to all control points or unicast to a specific control point. Broadcast indications may be used, for example, by a service entity to update control points about its state, as well as that of any associated user interfaces. Unicast indications, on the other hand, may be delivered to specifically targeted control points. When an event causes a service to issue a unicast indication, the service may check for any requests associated with the indication in the message definition, and deliver a unicast indication to each control point that issued an associated request. If a unicast indication does not have an associated request, the service may nevertheless issue the unicast indication to an appropriate control point, e.g., a message to revoke a client ID. In an embodiment, a control point may ignore any unsupported indications it receives.

According to one aspect of the messaging protocol, several service messages from a single client to a single service entity may be bundled together into one transmission to make efficient use of the communication link. The bundled transmission may be in the form of a payload, which may also carry other control parameters related to the bundled transmission. In one embodiment, several service messages may be bundled together if they logically form a unit, e.g., a set of messages required to implement a single API command, or a set of periodically issued status query requests. In one embodiment, the payload may comprise a field that specifies the message type of the bundled service messages, e.g., whether the messages are request, response, or indication messages. In another embodiment, the payload may also specify a transaction ID field that can be uniquely associated with each payload issued by a control point. Thereafter, a service entity can append the same transaction ID to a response message associated with the request message. In one embodiment, a control point increments the transaction ID each time a new request message is sent.

In one embodiment, a service entity processes each request in a bundled request message, and returns all corresponding responses in a single bundled response message in the same order as they were received in the bundled request. If an unrecognized request is included in a bundle, a service entity may include an error message in the bundle transmitted in response to the request. If the length of a request in a bundled request is received incorrectly, a service entity may include in a bundled response all responses to any successfully processed requests preceding the corrupt request, bundled with a single error message response indicating an unrecognized received request. Lastly, if a service message is correctly received, but a parameter within the service message is corrupt, then either a general error message or an error message specific to the service message may be returned.

In a multiplexing aspect of the messaging protocol, payloads from different control points intended for different service entities, and vice versa, can be sent over the same physical interconnection by attaching to each payload an associated client ID field and a service type field to form a multiplex message. For example, in FIG. 1, bundled service messages sent between control point 101 and service entity 115 over service interface 107 may have a client ID set to 1 and a service type set to 2. Similarly, payloads sent between control point 102 and service entity 114 over service interface 108 may have a client ID set to 1 and a service type set to 1, while payloads sent between control point 103 and service entity 114 over service interface 108 may have a client ID set to 2 and a service type set to 1. In this way, all service messages may be sent over the same MUX layer. Note in particular, this aspect of the messaging protocol enables multiple control points to communicate with a single service entity by assigning each control point a unique client ID.

In one embodiment, a control field may also be attached to the payload indicating whether the origin of the message is a control point or a service entity. This allows for Service and Control points to be interchangeably located on both the terminal equipment and the DCD.

Any or all of the client ID, service type, and control flag fields may be appended to the payload as a preamble or a postamble, or they may be located anywhere within the payload, as long as such location is pre-defined according to the particular message format. An implementation of a transmitter for the messaging protocol may append these parameters to the payload prior to transmission over the physical interconnect. Similarly, once a receiver implementation receives a message, the receiver may strip the fields from the payload and dispatch the payload to the designated control point or service entity.

In general, multiple control points may interface with a single service entity using the multiplexing scheme described above. To resolve possible contention among multiple control points sharing a common resource on the DCD, the service entity may maintain service shared state variables. The service entity may provide to control points information on the state variable via polling (e.g., request and response messages), and/or an event-based indication message. In an alternative embodiment, a service entity can allocate multiple resources to assign to each client, e.g., to maintain a Quality of Service (QoS) flow, in which case each control point may maintain a separate service state variable for each control point.

Another aspect of the messaging protocol provides for handling differences in service message format versions between a control point and a service entity. In actual device inter-operation, the case may arise wherein service messages supported by a control point are of a different (i.e., earlier or later) version than that supported by a service entity. In particular, a major service version difference arises when a service is changed such that a particular message format becomes incompatible with a previous message format. Changes that would cause a major version to be incremented include, but are not limited to, changing the meaning of an existing message, removing a message entirely from the list of defined messages, removing a mandatory parameter associated with a message ID, changing the meaning of any parameter associated with a message ID, and adding any mandatory semantics to a message format.

In contrast, a minor version difference arises when a service specification is changed without breaking backwards compatibility with previous specifications of the same major version. This may occur, for example, when new features are added to a service. Changes that would cause a minor version to be incremented include, but are not limited to, adding a new message, adding a new optional parameter to an existing message, adding a new error code to an existing message, and adding a new value to an existing parameter without changing the application of the existing values.

Version differences between control points and service entities may be determined when a service entity indicates its version, either through poll (request/response) messaging or indication messaging. To facilitate inter-operability of control points and service entities having different message format versions, the messaging protocol may specify a way to deal with such version differences. According to one embodiment, a control point will not inter-operate with a service entity utilizing a different major version number, and vice versa. A control point may nevertheless inter-operate with a service entity utilizing the same major version, but a different minor version. Such inter-operability may be achieved as follows.

For cases wherein a control point minor version is greater (i.e., newer) than a service entity minor version, the control point and service entity may observe certain operating rules. First, the control point may detect the service's (older) minor version and only issue compatible messages and/or parameters. Newer control messages that might trigger unsupported functionality at the service entity may be disabled. For example, in one embodiment, unsupported graphical user interface buttons at the client may be disabled. Second, the control point may ignore the service's minor version and blindly issue the newer requests. The service entity would then reject the unrecognized requests, and ignore unrecognized parameters. The service entity may nevertheless perform the request if it recognizes the message and all included parameters are valid. Third, the control point can be configured so that lack of optional parameters in response or indication messages from the service entity does not disrupt proper operation of the control point. Fourth, the control point can also be configured such that lack of new indication messages from the service does not disrupt proper operation of the control point.

For cases wherein a control point minor version is less (i.e., older) than a service entity minor version, the control point and service entity can operate according to certain other procedures. In response to the control point issuing the older requests, the service entity may respond with both older and newer parameters. In this case, the control point may simply ignore the newer unrecognized parameters, and process the older parameters as it would under the older service version. The control point may also ignore any indication messages that are of a higher service version.

Note that the above operating rules may also be applied whenever a received message contains unrecognizable optional parameters or fields, e.g., due to corruptions introduced by the physical interconnect, simply by treating the unrecognizable parameter or field as corresponding to an unsupported message version.

In one embodiment, to ensure that devices utilizing different minor service versions will nevertheless be inter-operable, the following rules may be observed in defining a service specification. First, mandatory parameters are not added or removed after a service version is specified. Second, optional parameters are not changed such that the original values are represented in a different way, or take on different meanings.

In one embodiment, the services messages defined for the messaging protocol may provide a common command set across multiple technologies supported by the DCD. For example, an application may issue a "get signal strength" command to simultaneously retrieve signal strength status from the DCD for all supported technologies. In this way, an application need not issue technology-specific commands, easing implementation of the application software. In addition to a common command set, the defined service messages may also include additional technology-specific commands, for example allowing configuration of technology-specific profiles for each data session. In one embodiment, a DCD may use a set of stored technology-specific profiles, or alternatively a device default profile employing only common command messages. Either the application or the DCD may decide which profile to use.

In one embodiment, service messages defined for the messaging protocol may be used in conjunction with commands specified according to another protocol, such as an AT command protocol. This may be achieved by setting the value of an interface type field of a message sent over the MUX layer to indicate that the entire MUX message is defined and formatted according to another protocol such as the AT command protocol. In an alternative embodiment, the MUX format may be preserved, but the service type field may be set to a value that indicates a corresponding payload carries messages defined according to another protocol, which may be a well-known protocol defined by a standards body or a predefined proprietary protocol.

Embodiments of message formats that may be used for the service interface messages and MUX layer messages will now be described. Note that the messaging protocol described in this disclosure need not employ the particular MUX format described herein, and various re-orderings, deletions, additions, and/or alternative bit lengths of the fields within the disclosed MUX format also fall within the scope of the contemplated messaging architecture and protocol.

Figure 3:
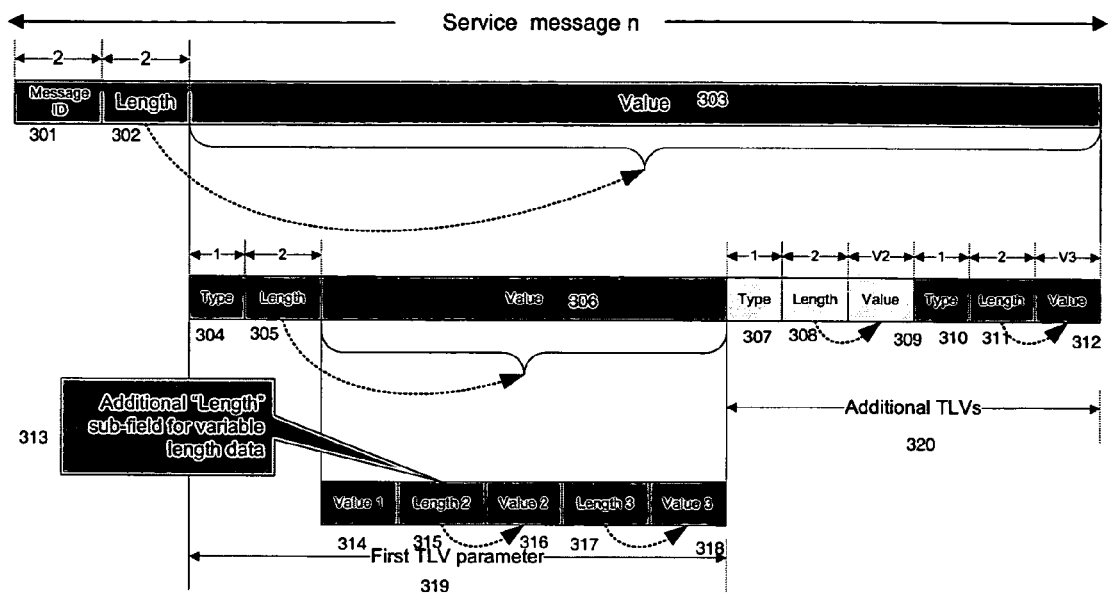
FIG. 3 shows a preferred message format for a service message according to an embodiment of the present invention.

FIG. 3 shows a preferred message format for a service message n such as those exchanged over service interfaces 107, 108, 109 shown in FIG. 1. In FIG. 3, the length of a field in bytes is indicated by a numeral above the corresponding field. Note that the field lengths shown are preferred field lengths only, and field lengths can in general be of arbitrary length in a particular MUX message format implementation. In a preferred embodiment, all bits in the MUX message may be transmitted in "little-endian" format, i.e., least significant bits first. In this specification, the convention for bit numbering is that bit 0 is the least significant bit.

Each service message can have a type-length-value (TLV) structure, comprising a message ID 301 which identifies what message is being sent, and a length field 302 specifying the length of a value field 303 that immediately follows the length field 302. In general, the type field allows discrimination of which parameter is being specified in a TLV structure. In one embodiment, the meaning of a type field is unique across all TLV parameters within a given service message, but not necessarily unique across all messages in a service entity or across all service entities. In one embodiment, value fields contain positive binary values unless otherwise specified. In this way, binary data can be natively supported by the present message format.

Note that depending on the particular service message, a value field 303 may itself further comprise a number of TLV parameters 319 and 320, each having an associated type, length, and value. The contents of a value field may further comprise more TLV parameters, etc. The first TLV parameter 319 illustrated in FIG. 3 shows a value field having additional length sub-fields 315, 317 to support variable length parameters within the value field 306 of the first TLV 319. Note the value sub-field 314 may not need an associated length if it is a fixed-length value given in the message definition.

Multiple parameters may thus be included in a single service message, and a type, length, and value may be explicitly specified for each parameter. The TLV format facilitates generally arbitrary ordering of parameters within a service message, unless the definition of a particular service message specifies otherwise, in which case the order in which a parameter appears may indicate its type. Each parameter may be either mandatory or optional. A mandatory parameter is a parameter that is always present in messages of a particular message ID, while an optional parameter is one that may or may not be present in a message of a particular message ID. In one embodiment, the lack of optional parameters in a service message does not cause an error or disrupt proper operation of the control point or service entity. A service entity may process a message and perform all indicated actions as long as all mandatory parameters are valid. In one embodiment, all mandatory parameters within a service message are placed before all optional parameters.

In one embodiment, the provision of optional TLV's allows the capability to support selective encryption of service messages. For example, a CTL service can negotiate encryption key parameters during initialization, while a particular service message to be encrypted can contain optional TLV's indicating the presence of an encrypted service message. As optional TLV's by definition need not be supplied in every service message, this enables selective encryption per message. Service messages can be selectively authenticated using a similar mechanism, by appending optional TLV's to a message to authenticate the sender of the message. Selective integrity protection can also be implemented by appending optional TLV's to a message to verify that it has not been tampered with, e.g., by appending the result of applying a hash function to the bits of the message.

Note that any information conveyed in a particular service message may be divided amongst any number of TLV parameters. In one embodiment, a single TLV is used for all logically coupled data elements of a data structure.

In an embodiment, the type field for each TLV in a service message is 1 byte long. The first 16 values (i.e., 0x00 to 0x0f) of the type field may have reserved meanings that are common across all messages of the same service type. Optional and additional TLV's for each message may start with type field values greater than 0x0f.

For example, type 0x01 may be used in all request messages to denote that the corresponding value field carries a set of mandatory parameters. In FIG. 3, the type field 304 of the first TLV parameter 319 may be set to 0x01, and the corresponding value field 306 may further comprise a series of parameters, which may each be specified by value fields 314, 316, 318 and length fields 315, 317. If there are no mandatory parameters defined for a message, it may omit the mandatory TLV. Optional parameters (if defined for the message ID) may follow the mandatory TLV.

In an embodiment, response-type messages may each include a mandatory first TLV known as a result code TLV, with type field set to 0x02. For each request received, a service entity may return a result code TLV with a value field indicating a success or failure. If failure is returned, an error status value may be returned, and the message may then omit any subsequent mandatory TLV parameters. Other mandatory fields for the response message (if defined for that message ID) may be contained in a mandatory TLV with type set to 0x01 following the result code TLV. Otherwise, the response message may omit the mandatory TLV. Optional parameters may follow the mandatory TLV's as individual TLV's.

In an embodiment, if indication-type messages have mandatory parameters, then those parameters are included in the value field of the first TLV as part of the mandatory TLV, with a type field set to 0x01. If there are no mandatory parameters, the indication message may omit the mandatory TLV. Any optional parameters may follow the mandatory TLV as individual TLV's.

Figure 4:
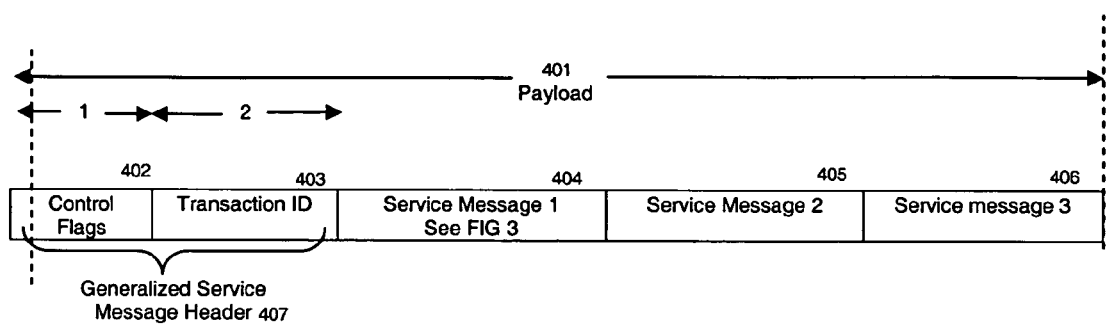
FIG. 4 shows an embodiment of a payload format that may be used in the layered messaging architecture described in FIG. 1 according to an embodiment of the present invention.

FIG. 4 shows an embodiment of a payload format that may be used in the layered messaging architecture described in FIG. 1.

In one embodiment, several service messages 404, 405, 406 may be bundled together into a single payload as shown in FIG. 4. The payload 401 may comprise fields such as control flags 402, transaction ID 403, followed by the series of service messages 404, 405, 406. The control flags 402 and transaction ID 403 fields may be collectively referred to as the generalized service message header 404. Note that in general, a payload may be configured to support an arbitrary number of service messages.

The control flags field 402 may specify the message type associated with the service messages contained in the payload message, e.g., request, response, or indication.

The transaction ID field 403 is a numerical identifier that can be used to index the messages sent, and/or associate a response message with a corresponding request message for a given client ID.

A specific MUX message format that can be employed for the MUX layer 105, 116 of FIG. 1 will be now be described.

Figure 5:
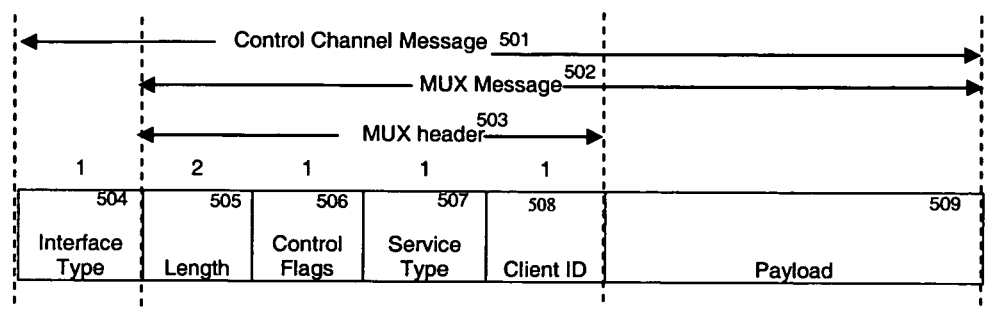
FIG. 5 shows an embodiment of a control channel message comprising a multiplex message according to an embodiment of the present invention.

The payload may be embedded in a control channel message 501 as shown in FIG. 5. The control channel message 501 may comprise a MUX MSG 502 and an interface type field 504. The control channel message 501 may have an interface type field 504 that specifies which type of MUX format is being used, or whether a MUX format is used at all. The interface type field may be set to a hex value of 0x01 to indicate that the following message is formatted according to the preferred MUX format described herein. It may be set to another value to indicate the use of an alternative format. In this way, interoperability with other control protocols can be achieved, e.g., AT commands may be encapsulated in the control channel message 501 by specifying a different value in the interface type field 504. The MUX message 502 itself may comprise fields such as length 505, control flags 506, service type 507, client ID 508, and payload 509. The length 505, control flags 506, service type 507, and client ID 508 fields may be collectively referred to as the MUX header field 503.

In an embodiment, the length field 505 may specify the overall length of the MUX message in bytes. In an alternative embodiment, the length field 505 may specify the length of only the payload field 509.

The control flags field 506 may specify various control parameters of interest. In a preferred embodiment, bit 7 of the control flags field 506 may specify whether the sender of the message is a service (bit 7 set to 1) or a control point (bit 7 set to 0). Unused bits in the control flags field 506 may be set to 0.

The service type field 507 may specify the service entity type of the message present in the payload field. For example, messages communicated to and from a device management service entity on the DCD may have the service type field 507 set to a value 0x01.

The client ID field 508 may identify the application client to which a message pertains. In a preferred embodiment, by setting this field to a value of 0xff, an indication message may be broadcast by a service entity to all control points or clients utilizing the service type specified in the service type field 507.

The payload field 509 may carry the actual service interface messages 107, 108, 109 exchanged between the control points 101, 102, 103 and service entities 114, 115 of FIG. 1.

Figure 7:
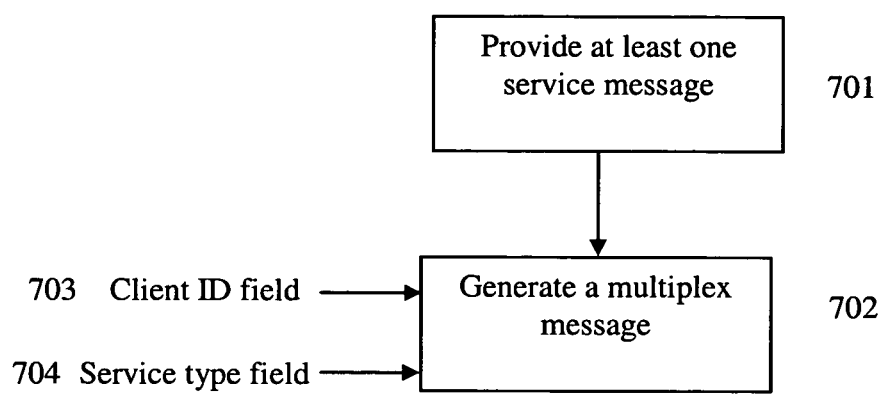
FIG. 7 shows a method for interfacing a plurality of devices according to an embodiment of the present invention.

FIG. 7 shows a method for interfacing a plurality of devices according to the present invention comprising the steps of providing at least one service message at block 701, and generating a multiplex message at block 702 comprising the at least one service message generated at block 701, a client ID field 703 for identifying a control point associated with the at least one service message, and a service type filed 704 for identifying a service entity associated with the at least one service message.

The techniques described herein may be used for data communication devices supporting various technologies such as CDMA and UMTS families of technologies, 802.11, Bluetooth, and so on. These techniques may also be used for other existing and future wireless network technologies. In general, the techniques may be used for a single-mode wireless device that supports a single wireless network technology and a multi-mode wireless device that supports multiple wireless network technologies.

The techniques described herein may be implemented by various means. For example, these techniques may be implemented in hardware, software, or a combination thereof. For a hardware implementation, the processing units used to support system selection may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the system selection techniques may be implemented with modules (e.g., procedures, functions, and so on) that perform the functions described herein. The software codes may be stored in a memory unit and executed by a processor. The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A data communication device for coupling to a terminal equipment, the data communication device comprising:
    at least one service entity for generating at least one service message,
    wherein said at least one service message comprises a first parameter comprising:
        a first type field for identifying a type of the first parameter;
        a first value field for specifying a value associated with the type identified in the first type field; and
        a first length field for specifying a length of the first value field;
        wherein the first value field comprises a second parameter comprising at least a second value field for specifying a value associated with a type of the second parameter;
    a multiplex module for generating a multiplex message, said multiplex message comprising:
        said at least one service message;
        a client ID field for identifying at least one control point associated with said at least one service message; and
        a service type field for identifying said at least one service entity associated with said at least one service message;
    a control service module to assign a client ID value for the client ID field to a control point on the coupled terminal equipment when unused client ID values are available, to release the assigned client ID value when the control point on the coupled terminal equipment no longer needs to communicate with the at least one service entity, and to obtain a service message version of the coupled terminal equipment.

2. The data communication device of claim 1, wherein said client ID value in the client ID field identifies all control points associated with said at least one service message.

3. The data communication device of claim 1, wherein said client ID value is set to a specific value to identify all control points associated with said at least one service message.

4. The data communication device of claim 1, further comprising a plurality of said at least one service entity on said data communication device.

5. The data communication device of claim 1, wherein said at least one service message further comprises a response message, and said multiplex message further comprises a message type field for identifying said multiplex message as comprising said response message.

6. The data communication device of claim 1, wherein said multiplex message further comprises a message type field for identifying said multiplex message as comprising an indication message.

7. The data communication device of claim 1, wherein said multiplex module is further configured to receive a multiplex message comprising:
   at least one received service message;
   a client ID field storing a client ID for identifying a control point associated with said at least one received service message; and
   a service type field storing a service type for identifying the service entity associated with said at least one received service message;
   wherein said at least one service entity is further configured to receive said at least one received service message from said multiplex module.

8. The data communication device of claim 7, wherein said at least one service entity is further configured to generate a plurality of service messages in response to said at least one service entity receiving from said multiplex module a plurality of received service messages, and wherein said multiplex module is further configured to generate a multiplex message comprising said generated plurality of service messages.

9. The data communication device of claim 8, wherein said plurality of service messages generated in response to said plurality of received service messages is ordered according to a receiving order of said plurality of received service messages.

10. The data communication device of claim 9, wherein said at least one service entity is configured to generate an error service message in response to receiving an unrecognized received service message.

11. The data communication device of claim 7, wherein said at least one service entity is configured to maintain a shared state variable for resolving contention among a plurality of control points.

12. The data communication device of claim 7, wherein said at least one service entity is configured to maintain a unique state variable for each one of a plurality of control points.

13. The data communication device of claim 7, wherein each of said at least one received service message comprises:
   a message ID field for identifying said at least one received service message;
   a message length field for specifying a length of a portion of said at least one received service message; and
   a message value field.

14. The data communication device of claim 13, wherein said message value field of said at least one received service message comprises a first type-length-value (TLV) field comprising:
   a first TLV type field for identifying a type of said first TLV;
   a first TLV value field for specifying a value associated with said first TLV type; and
   a first TLV length field for specifying a length of said first TLV value field.

15. The data communication device of claim 14, wherein said first TLV is a mandatory TLV for said at least one received service message.

16. The data communication device of claim 15, wherein said first TLV value field comprises a plurality of value fields.

17. The data communication device of claim 14, wherein said message value field of said at least one received service message further comprises additional TLV's.

18. The data communication device of claim 17, wherein said additional TLV's comprise optional TLV's.

19. The data communication device of claim 18, wherein said optional TLV's comprise at least one encryption parameter for encrypting said at least one received service message.

20. The data communication device of claim 18, wherein said optional TLV's comprise at least one authentication parameter for authenticating said at least one received service message.

21. The data communication device of claim 18, wherein said optional TLV's comprise at least one integrity protection parameter for verifying the integrity of said at least one received service message.

22. The data communication device of claim 7, wherein said at least one service entity is configured to, in response to receiving a received service message having a higher minor service version than supported by said at least one service entity, skip unrecognized optional TLV's in said received service message.

23. The data communication device of claim 7, wherein said at least one service entity is configured to, in response to receiving an unrecognized received service message having a higher minor service version than supported by said at least one service entity, ignore said unrecognized received service message.

24. The data communication device of claim 7, wherein said at least one service entity is configured to, in response to receiving a received service message having a lower minor service version than supported by said at least one service entity, generate only service messages having the same or lower service version as the service version of said received service message.

25. The data communication device of claim 7, wherein said at least one service entity is configured to, in response to receiving an unrecognized received service message, reject said unrecognized received service message.

26. The data communication device of claim 7, wherein said at least one service entity is configured to, in response to receiving an unrecognized received service message, ignore said unrecognized received service message.

27. The data communication device of claim 1, wherein said data communication device is configured to communicate over a wireless air interface.

28. The data communication device of claim 1, wherein said at least one service entity is a device management service entity.

29. The data communication device of claim 1, wherein said at least one service entity is a wireless data service entity.

30. The data communication device of claim 1, wherein said at least one service entity is a network access service entity.

31. The data communication device of claim 1, wherein said at least one service entity is a location-based service entity.

32. The data communication device of claim 1, wherein said multiplex message further comprises a transaction ID field for storing a transaction ID associated with said multiplex message.

33. The data communication device of claim 1, further comprising a logical device driver for providing a data channel, and a control channel for said multiplex message, said control channel being independent of said data channel.

34. The data communication device of claim 33, wherein said logical device driver is configured to operate with a Universal Serial Bus (USB).

35. The data communication device of claim 1, wherein said terminal equipment is a personal computer.

36. The data communication device of claim 1, wherein said multiplex message further comprises a control flag field indicating whether said at least one control point is a control point or a service entity.

37. The data communication device of claim 1, wherein said device is further configured to generate a non-multiplex message comprising a service message generated by said at least one service entity.

38. The data communication device of claim 1, wherein said at least one service message comprises an AT command message.

39. The data communication device of claim 1, wherein said at least one service message further comprises:
   a message ID field for identifying said at least one service message, a second value field comprising the first parameter; and a second length field for specifying a length of the second value field.

40. The data communication device of claim 39, wherein the second value field comprises a plurality of parameters.

41. The data communication device of claim 1, wherein the first value field comprises a plurality of value fields.

42. The data communication device of claim 1, wherein the first value field comprises a plurality of value fields and a plurality of length fields each of which specifies a length of a respective one of the plurality of value fields.

43. The data communication device of claim 1, wherein the service type field is not contained within said at least one service message.

44. The data communication device of claim 1, wherein the at least one control point identified by the client ID field is an application, application client, driver, kernel module, or library.

45. A method for interfacing a data communication device to a terminal equipment, the method comprising:
   providing at least one service message to or from the data communication device,
   wherein said at least one service message comprises a first parameter comprising:
      a first type field for identifying a type of the first parameter;
      a first value field for specifying a value associated with the type identified in the first type field; and
      a first length field for specifying a length of the first value field;
   wherein the first value field comprises a second parameter comprising at least a second value field for specifying a value associated with a type of the second parameter;
   generating a multiplex message comprising:
      said at least one service message;
      a client ID field for identifying a control point associated with said at least one service message; and
      a service type field for identifying a service entity associated with said at least one service message;
   assigning, by a control service module associated with the data communication device, a client ID value for the client ID field to a control point on the terminal equipment when unused client ID values are available;
   releasing the assigned client ID value when the control point on the terminal equipment no longer needs to communicate with the service entity; and
   obtaining a service message version of the terminal equipment.

46. The method of claim 45, wherein said multiplex message further comprises a message type field for identifying a message type of said at least one service message.

47. The method of claim 46, wherein said message type is a request message type.

48. The method of claim 45, further comprising demultiplexing a received multiplex message, said received multiplex message comprising:
   at least one received service message;
   a client ID field storing a client ID value for identifying a control point associated with said at least one received service message;
   a service type field storing a service type for identifying a service entity associated with said at least one received service message.

49. The method of claim 48, further comprising providing, for each of a plurality of demultiplexed request service messages, an associated response service message.

50. The method of claim 49, further comprising multiplexing each associated response service message in the order in which a corresponding demulitplexed request service message was received.

51. The method of claim 50, further comprising generating an error response service message associated with an unrecognized received request service message.

52. The method of claim 48, wherein said multiplex message further comprises a transaction ID field storing a transaction ID associated with said multiplex message.

53. The method of claim 52, further comprising incrementing said transaction ID each time a multiplex message is generated.

54. The method of claim 48, further comprising skipping unrecognized received service messages.

55. The method of claim 54, wherein said skipping is in response to receiving unrecognized service messages.

56. The method of claim 48, further comprising generating only service messages having the same or lower service version of said at least one received service message.

57. The method of claim 48, wherein said at least one received service message comprises:
   a message ID field for identifying said at least one received service message;
   a message length field for specifying a length of a portion of said at least one received service message; and
   a message value field.

58. The method of claim 57, wherein said message value field of said at least one received service message comprises a first type-length-value (TLV) field comprising:
   a first TLV type field for identifying a type of said first TLV;
   a first TLV value field for specifying a value associated with said first TLV type; and
   a first TLV length field for specifying a length of said first TLV value field.

59. The method of claim 58, wherein said first TLV is a mandatory TLV for said at least one service message.

60. The method of claim 59, wherein said first TLV value field comprises a plurality of value fields.

61. The method of claim 58, wherein said message value field of said at least one received service message further comprises additional TLV's.

62. The method of claim 61, wherein said additional TLV's comprise optional TLV's.

63. The method of claim 62, wherein said optional TLV's comprise at least one encryption parameter for encrypting said at least one received service message.

64. The method of claim 62, wherein said optional TLV's comprise at least one authentication parameter for authenticating said at least one received service message.

65. The method of claim 62, wherein said optional TLV's comprise at least one integrity protection parameter for verifying the integrity of said at least one received service message.

66. The method of claim 48, wherein the service entity is configured to, in response to receiving a received service message having a higher minor service version than supported by the service entity, skip unrecognized optional TLV's in said received service message.

67. The method of claim 48, wherein the service entity is configured to, in response to receiving an unrecognized received service message having a higher minor service version than supported by said at least one service entity, ignore said unrecognized received service message.

68. The method of claim 48, wherein the service entity is configured to, in response to receiving a received service message having a lower minor service version than supported by said at least one service entity, generate only service messages having the same or lower service version as the service version of said received service message.

69. The method of claim 48, wherein the service entity is configured to, in response to receiving an unrecognized received service message, reject said unrecognized received service message.

70. The method of claim 48, wherein the service entity is configured to, in response to receiving an unrecognized received service message, ignore said unrecognized received service message.

71. The method of claim 45, further comprising providing an independent control channel for said multiplex message, and an independent data channel.

72. The method of claim 45, wherein said at least one service message comprises:
a message ID field for identifying said at least one service message;
a message length field for specifying a length of a portion of said at least one service message; and
a message value field.

73. The method of claim 45, wherein said at least one service message further comprises:
a message ID field for identifying said at least one service message;
a second value field comprising the first parameter; and
a second length field for specifying a length of the second value field.

74. The method of claim 73, wherein the second value field comprises a plurality of parameters.

75. The method of claim 45, wherein the first value field comprises a plurality of value fields.

76. The method of claim 45, wherein the first value field comprises a plurality of value fields and a plurality of length fields each of which specifies a length of a respective one of the plurality of value fields.

77. The method of claim 45, wherein the service type field is not contained within said at least one service message.

78. The method of claim 45, wherein the at least one control point identified by the client ID field is an application, application client, driver, kernel module, or library.

79. An apparatus for interfacing a data communication device to a terminal equipment, the apparatus comprising:
means for providing at least one service message to or from the data communication device,
wherein said at least one service message comprises a first parameter comprising:
a first type field for identifying a type of the first parameter;
a first value field for specifying a value associated with the type identified in the first type field; and
a first length field for specifying a length of the first value field;
wherein the first value field comprises a second parameter comprising at least a second value field for specifying a value associated with a type of the second parameter;
means for generating a multiplex message comprising:
said at least one service message;
a client ID field for identifying a control point associated with said at least one service message; and
a service type field for identifying a service entity associated with said at least one service message;
means for assigning, by a control service module associated with the data communication device, a client ID value for the client ID field to a control point on the terminal equipment when unused client ID values are available, releasing the assigned client ID value when the control point on the terminal equipment no longer needs to communicate with the service entity, and obtaining a service message version of the terminal equipment.

80. A computer program product for interfacing a data communication device to a terminal equipment, comprising:
a non-transitory computer-readable storage medium comprising:
a first set of codes for causing a computer to provide at least one service message to or from the data communication device, wherein said at least one service message comprises a first parameter comprising:
a first type field for identifying a type of the first parameter;
a first value field for specifying a value associated with the type identified in the first type field; and
a first length field for specifying a length of the first value field;
wherein the first value field comprises a second parameter comprising at least a second value field for specifying a value associated with a type of the second parameter;
a second set of codes for causing the computer to generate a multiplex message comprising:
said at least one service message;
a client ID field for identifying a control point associated with said at least one service message; and
a service type field for identifying a service entity associated with said at least one service message;
a third set of codes for causing a control service module associated with the data communication device to assign a client ID value for the client ID field to a control point on the terminal equipment when unused client ID values are available, to release the assigned client ID value when the control point on the terminal equipment no longer needs to communicate with the service entity, and obtaining a service message version of the terminal equipment.

81. At least one processor in a data communication device for interfacing to a terminal equipment, the at least one processor comprising:
a first hardware module for providing at least one service message to or from the data communication device,
wherein said at least one service message comprises a first parameter comprising:
a first type field for identifying a type of the first parameter;

a first value field for specifying a value associated with the type identified in the first type field; and a first length field for specifying a length of the first value field;

wherein the first value field comprises a second parameter comprising at least a second value field for specifying a value associated with a type of the second parameter;

a second module for generating a multiplex message comprising:

said at least one service message;

a client ID field for identifying a control point associated with said at least one service message; and a service type field for identifying a service entity associated with said at least one service message;

a third module for assigning a client ID value for the client ID field to a control point on the terminal equipment when unused client ID values are available, releasing the assigned client ID value when the control point on the terminal equipment no longer needs to communicate with the service entity, and obtaining a service message version of the terminal equipment.

* * * * *